United States Patent [19]

Kawamura et al.

[11] Patent Number: 4,970,449
[45] Date of Patent: Nov. 13, 1990

[54] NUMERICAL CONTROL APPARATUS

[75] Inventors: Hideaki Kawamura, Hachioji; Kentaro Fujibayashi, Musashino; Morimasa Sato, Hachioji, all of Japan

[73] Assignee: Fanuc Ltd, Minamitsuru, Japan

[21] Appl. No.: 381,642
[22] PCT Filed: Nov. 21, 1988
[86] PCT No.: PCT/JP88/01178
§ 371 Date: Jul. 11, 1989
§ 102(e) Date: Jul. 11, 1989
[87] PCT Pub. No.: WO89/05005
PCT Pub. Date: Jun. 1, 1989

[30] Foreign Application Priority Data

Nov. 20, 1987 [JP] Japan .................................. 62-293541

[51] Int. Cl.$^5$ .............................................. G05B 19/18
[52] U.S. Cl. ..................................... 318/569; 318/625; 29/36
[58] Field of Search .................... 318/569, 625; 29/36

[56] References Cited

U.S. PATENT DOCUMENTS 4,080,853 3/1978 Goto .................................... 29/36 X
4,683,786 8/1987 Kernten et al. ................. 318/625 X Primary Examiner—William M. Shoop, Jr.
Assistant Examiner—Saul M. Bergmann
Attorney, Agent, or Firm—Staas & Halsey

[57] ABSTRACT

A numerical control apparatus according to the invention has a mode designating interface for deciding a control mode and an interface which receives position and velocity commands, these interfaces being interposed between the apparatus and a servo-processor. A mode for controlling the servomotor is automatically decided internally of the numerical control apparatus. Changeover is possible in which the servomotor is used as a motor for positional control or in order to control rotational velocity in the manner of a spindle motor to achieve continuous rotation.

3 Claims, 3 Drawing Sheets

NUMERICAL CONTROL APPARATUS

TECHNICAL FIELD

This invention relates to a numerical control apparatus for controlling the C axis (controlled axis) of a workpiece rotating shaft in a cylindrical grinder or three-axis lathe.

BACKGROUND ART

When a servomotor is controlled by a numerical control apparatus (CNC) using a computer, it is possible to switch between an arrangement in which the servomotor is used as a motor for positionally controlling a spindle and an arrangement in which the servomotor is used as a motor for controlling rotational velocity in the same manner as a spindle motor.

In FIG. 2, a workpiece rotating shaft is provided with a servomotor M1 and a spindle motor M2 controlled by being respectively connected to a servomotor control circuit B and a spindle control circuit C to which command signals from a control apparatus A are applied. With this method of control, however, a problem encountered is the high cost necessary for constructing the motors and their control circuits.

Accordingly, a system has been developed (FIG. 3) in which a single servomotor M0 is switchingly connected to a position control circuit D and a velocity control circuit E by a switch SW in response to a signal from the control apparatus A, thereby enabling positional control and velocity control to be realized.

FIG. 4 is a block diagram illustrating the changeover control performed by the conventional control apparatus A shown in FIG. 3. In FIG. 4, the data in a part program 1 of the CNC driven by a host computer or the like are extracted as position command signals by a decoding processor 2 and pulse distribution processor 3. The decoding processor 2 is connected to a programmable machine control (PMC) 5 via a data in/data out (DI/DO) control processor 4. A position command signal of the pulse distribution processor 3 is outputted to a servo-control processor 7 as a position command signal for each axis via an axis control processor 6. The servo-control processor 7 functions as a position control circuit with regard to a controlled-axis motor when a servomotor 9 is employed as both a spindle motor (X axis) and controlled axis (C axis) motor. In order for the position command signal to be converted into a velocity command signal for control of the controlled-axis motor, the signal is outputted to a velocity/current control circuit 8. It should be noted that N in the servomotor 9 indicates another axis.

Meanwhile, the signal that has been subjected to decoding processing enters the DI/DO control processor 4. In order to execute processing for an auxiliary function M, an S function for automatically reducing spindle rotating speed by a tape command and a T function for automatically selecting a tool, the DI/DO control processor 4 delivers a predetermined signal to the PMC 5. A spindle control and D/A conversion unit 10, which are provided in the PMC 5, and a changeover circuit 11 constitute a controller 12. In a case where the servomotor 9 has its rotational velocity controlled to serve as a spindle motor, the spindle control and D/A conversion unit 10 delivers a changeover command and velocity command voltage to the changeover circuit 11. The changeover circuit 11 responds by changing over the control mode to separate the position control circuit 7 from the velocity/current control circuit 8, and by outputting the velocity command voltage from the spindle control and D/A conversion unit 10 to the velocity/current control circuit 8. The spindle control and D/A conversion unit 10 outputs a feedback-ignore command to the servo-control processor 7 to enable open-loop control of the servomotor.

However, when rotational-velocity control and position control of a spindle are thus performed by a single servomotor, two control circuits, namely the circuit E for controlling rotational velocity and the circuit D for controlling position, are required. The result is a complicated arrangement. In addition, a command relating to control of position is not applied in the mode for commanding velocity. Therefore, when the mode is returned to that for commanding position, a reference point (origin) restoration operation is required in order to re-establish the coordinate system.

SUMMARY OF THE INVENTION

The present invention has been devised in order to solve the foregoing problems and its object is to provide a numerical control apparatus in which it is possible to perform positional control and rotational-velocity control with a single C-axis servomotor.

In accordance with the present invention, there is provided a numerical control apparatus for controlling a machine tool having a controlled axis subjected to positional control or rotational-velocity control by the same servomotor, characterized by comprising commanding means for forming a position command, rotational-velocity command and mode changeover command, a first interface for designating a positional control mode or rotational-velocity control mode for the servomotor, and a second interface for receiving a position command signal in the positional control mode and a rotational-velocity command signal in the rotational-velocity control mode.

Accordingly, the numerical control apparatus of the invention is such that when a controlled axis such as a workpiece rotation axis in a three-axis lathe or the like is controlled by a servomotor, changeover between position control and rotational-velocity control is performed by a changeover command of a part program. This eliminates the need for two control circuits for positional control and rotational-velocity control and therefore reduces cost.

Further, since a high-speed microprocessor is used also for separate control of a servomotor in modern machine tools, it is unnecessary to provide an interface based on a velocity command voltage as in the prior art. Even in such case, however, the numerical control apparatus of the invention enables high-speed processing of all position, velocity and current commands and can be applied to a digital servo-system in which the interface between the numerical control apparatus and a servoamplifier is processed by digital signals. This makes highly efficient CNC control possible.

DESCRIPTION OF THE PREFERRED EMBODIMENT

An embodiment of the invention will now be described in detail with reference to the drawings.

Figure 1:
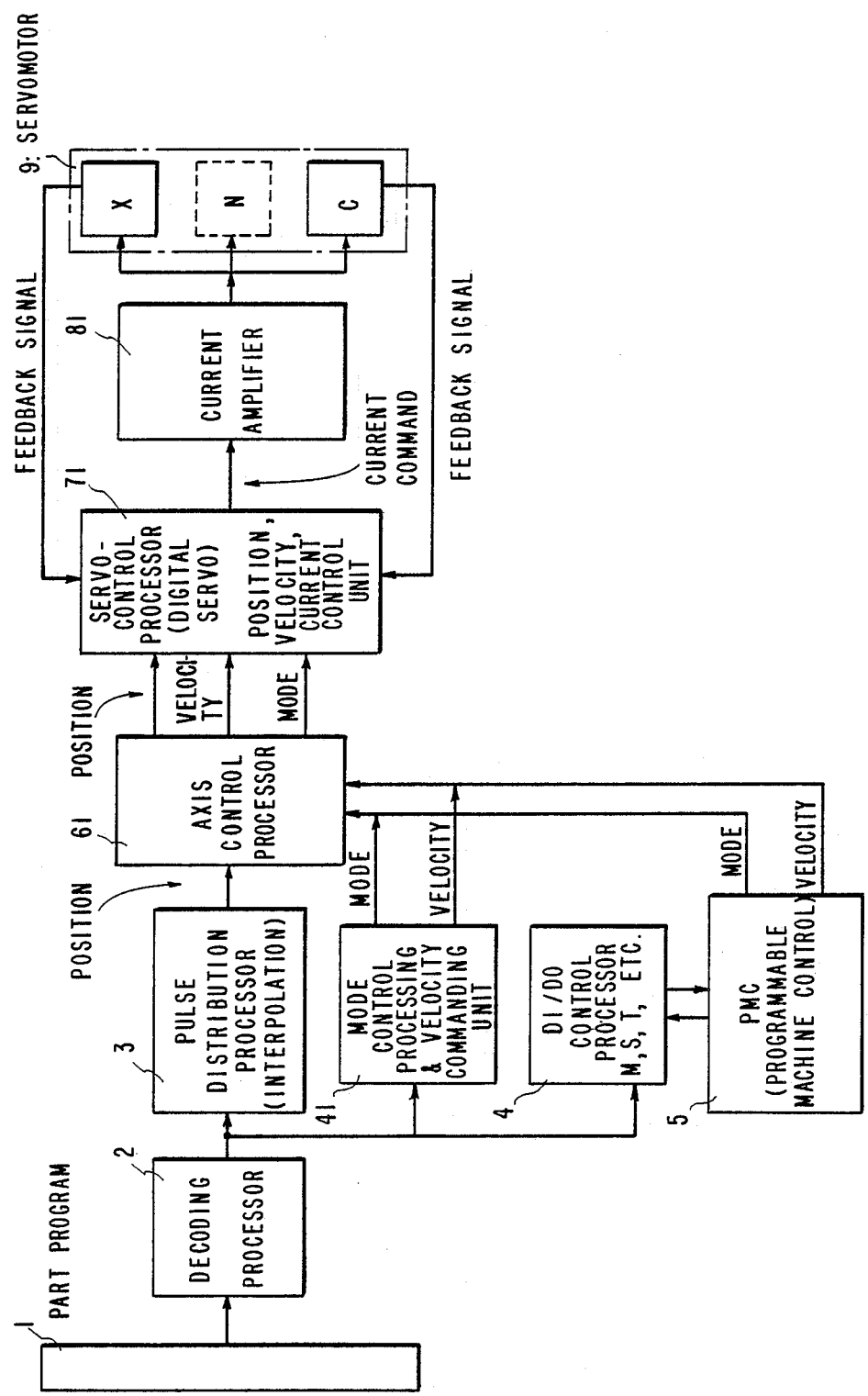
FIG. 1 is a block diagram illustrating the simplfied construction of an embodiment of the invention.
Figure 2:
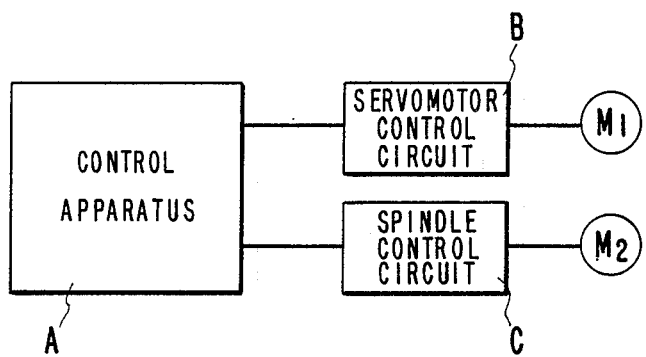
FIGS. 2 and 3 are block diagrams for describing conventional systems.
Figure 3:
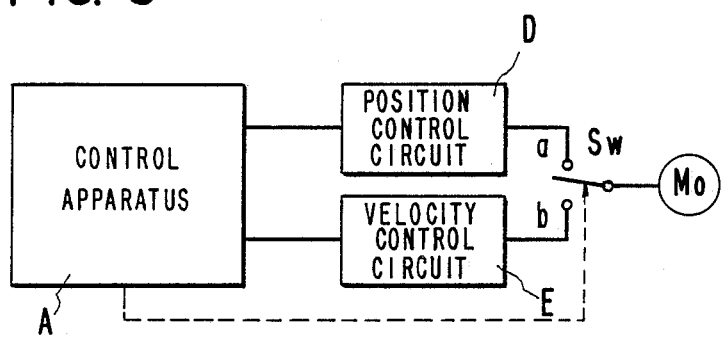
Figure 4:
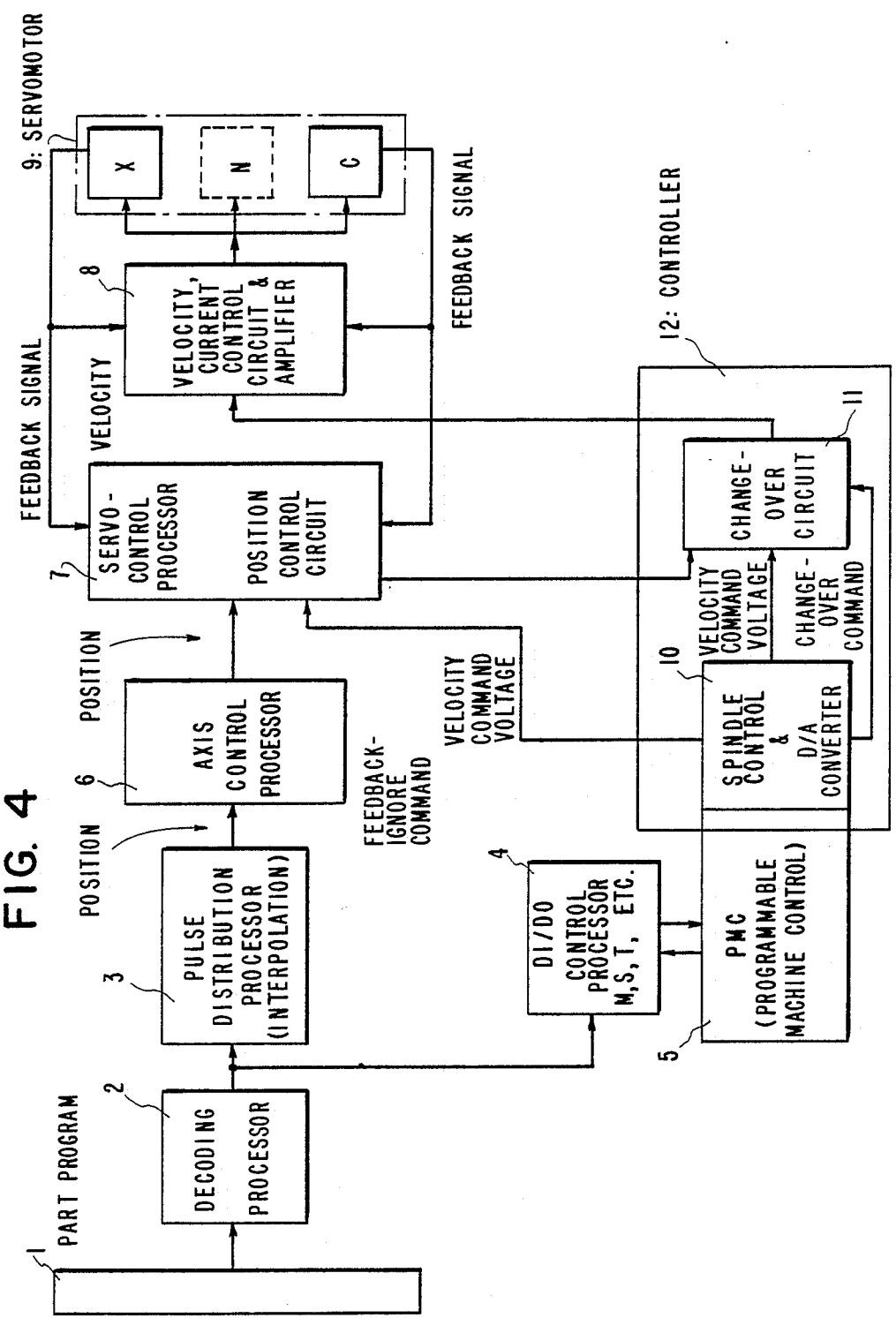
FIG. 4 is a block diagram showing an example of the prior art.

FIG. 1 is a block diagram illustrating the simplified construction of an embodiment of the invention. In FIG. 1, structural elements identical with those of the prior art described in FIG. 4 are designated by like reference characters and a description thereof is deleted.

The part program 1 is formed as a position command signal by the decoding processor 2 and pulse distribution processor 3. An axis control processor 61 outputs a position command signal, velocity command signal and mode setting signal to a servo-control processor 71 of digital servo construction. The servo-control processor 71 has circuitry for controlling the position, velocity and current of the servomotor 9 and controls the rotational velocity and position of a spindle motor and controlled-axis motor by applying a current command to a velocity amplifier 81.

Next, the data of the part program 1 decoded by the decoding processor 2 enter a mode control processing and velocity commanding unit 41, from which the mode setting signal and velocity command signal are read out and delivered to the axis control processor 61. Specifically, as set forth above, the axis control processor 61 provides the servo-control processor 71 with the position command signal formed by the pulse distribution processor 3 and the mode setting signal and velocity command signal read out of the mode control processing and command velocity command unit 41.

The data in the part program read out of the decoding processor 2 are transmitted also to the DI/DO control processor 4, which forms the M-, S- and T-function processing signals and delivers a predetermined signal to the PMC 5. The latter applies a predetermined control processing signal to the controlled machine, forms a mode setting signal and a velocity command signal with regard to the servomotor 9 and delivers these signals to the axis control processor 61.

The position command signal, velocity command signal and mode setting signal thus read out of the part program 1 each enter the servo-control processor 71. In accordance with the mode setting signal, changeover of the control mode from, e.g., position control to rotational-velocity control of the controlled-axis motor is carried out solely by the changeover command from the part program 1. That is, it can be arranged so that velocity control is carried out with the controlled-axis motor, which is subjected solely to position control in the prior art, serving as a spindle motor. Since the controlled-axis motor is subjected only to position control in the prior art, the gain of the control system is low and, hence, a large rotational velocity cannot be obtained. The controlled-axis motor therefore cannot be employed as a spindle motor. In the present invention, however, gain can be variably set by the changeover command from the part program 1 in the CNC in such a manner that rotational-velocity control is performed along with position control. It is also possible to command changeover between position control and rotational-velocity control from the PMC 5 controlling the controlled machine. When velocity control mode changeover is carried out, the velocity command signal can be outputted from the PMC 5. As a result, the scope of utilization can be widened.

Also, when the control mode is changed over from position control to rotational-velocity control of the servomotor 9, the arrangement is such that the position feedback signal enters the servo-control processor 71. Therefore, even when the rotational axis present position information in the CNC is updated followed by again changing over from the velocity control mode to the position control mode, reference point restoration processing for re-establishing the coordinate system is not required in the CNC. As a result, processing internally of the CNC is simplified.

Though an embodiment of the present invention has been described, the invention it not limited thereto but can be modified in various ways without departing from the scope of the claims.

The numerical control apparatus of the present invention can be used for a machine tool, such as a cylinder grinder or three-axis lathe, in which the C axis of a workpiece rotation axis is controlled by a servomotor. Numerical control is possible even if the C-axis servomotor serves as a motor for controlling position or a motor for controlling rotational velocity.

We claim:

1. A numerical control apparatus for controlling a servomotor of a machine tool having a controlled axis subjected to position control or rotational-velocity control by the same servomotor, comprising:
   commanding means for forming a position command, velocity command and mode setting signal;
   first means for designating at least one of a positional control mode and a rotational-velocity control mode for the servomotor; and
   second means for receiving a position command signal in the positional control mode and the velocity command signal in the rotational-velocity control mode.

2. A numerical control apparatus according to claim 1, further comprising;
   programmable machine control (PMC) means for generating and providing another velocity command and another mode setting signal to said second means.

3. A numerical control apparatus according to claim 1, wherein said apparatus further comprises:
   memory means for updating and storing the servomotor present position based on position feedback pulses from the servomotor in the rotational-velocity control mode, wherein reference point restoration for re-establishing a coordinate system is unnecessary when making a subsequent changeover from the rotational-velocity control mode to the positional control mode.

* * * * *